US 6,721,680 B2

(12) United States Patent
Sorrells et al.

(10) Patent No.: US 6,721,680 B2
(45) Date of Patent: Apr. 13, 2004

(54) MAXIMUM PAYLOAD SPEED MANAGER

(75) Inventors: Giles Kent Sorrells, Forsyth, IL (US); Dennis A. Barney, Morton, IL (US)

(73) Assignee: Caterpillar Inc, Peoria, IL (US)

( * ) Notice: Subject to any disclaimer, the term of this patent is extended or adjusted under 35 U.S.C. 154(b) by 130 days.

(21) Appl. No.: 10/024,211

(22) Filed: Dec. 21, 2001

(65) Prior Publication Data

US 2003/0120455 A1 Jun. 26, 2003

(51) Int. Cl.[7] .............................................. G01G 19/14
(52) U.S. Cl. ........................ 702/174; 701/98; 477/120
(58) Field of Search ................. 702/174, 182, 702/175; 701/98, 96, 95, 93, 70, 67; 477/120, 111

(56) References Cited

U.S. PATENT DOCUMENTS

| 4,635,739 A | * | 1/1987 | Foley et al. ................. 177/45 |
| 5,067,572 A | | 11/1991 | Kyrtsos et al. |
| 5,070,953 A | | 12/1991 | Kyrtsos et al. |
| 5,082,071 A | | 1/1992 | Kyrtsos et al. |
| 5,105,895 A | | 4/1992 | Kyrtsos |
| 5,182,712 A | | 1/1993 | Kyrtsos et al. |
| 5,650,928 A | | 7/1997 | Hagenbuch |
| 5,714,719 A | | 2/1998 | Otsuka et al. |
| 5,742,914 A | | 4/1998 | Hagenbuch |
| 5,955,706 A | | 9/1999 | Fonkalsrud et al. |
| 6,052,644 A | * | 4/2000 | Murakami et al. ............ 701/93 |

FOREIGN PATENT DOCUMENTS

DE          4235570        *  4/1994

* cited by examiner

Primary Examiner—John Barlow
Assistant Examiner—Stephen J. Cherry
(74) Attorney, Agent, or Firm—Finnegan, Henderson, Farabow, Garrett & Dunne

(57) ABSTRACT

A method is provided for promoting compliance by a vehicle operator with a payload standard for a vehicle. The payload weight of the vehicle is determined. The payload weight is compared with the payload standard to determine if the payload weight is compliant with the payload standard. The operation of the vehicle is then limited if the payload weight is not in compliance.

23 Claims, 3 Drawing Sheets

MAXIMUM PAYLOAD SPEED MANAGER

TECHNICAL FIELD

The present invention relates generally to standards for vehicle operation and maintenance, and more particularly to a system and method for protecting vehicles and operators when operating outside the standards as well as for promoting compliance with the standards.

BACKGROUND

A number of industries, such as the mining industry, rely on large off-highway trucks to transport large cargo loads. Not only are the loads themselves extensive, but these trucks are frequently operated around the clock. Manufacturers or dealers of these off-highway trucks often specify operating and maintenance standards, such as maximum operating weights, in order to achieve a longer operating life of the vehicle.

Sometimes the specified maximum operating weight is viewed as the target weight, rather than a weight that should not be exceeded, as there may be divergent interests in this area. Hauling a heavier load may result in a greater profit for the operation, at least in the short term. But, frequent overloading will adversely affect vehicle life and operation. Overloading may also result in reduced fuel efficiency and increased operating costs. Additionally, overloading may increase wear on components and may break structural joints. Some studies have shown that every one ton increase in mean payload (or cargo weight) above target decreases component life by approximately 1%. Further, repeated overloads may potentially decertify brake and/or steering systems in the vehicle. This represents an undesirable situation for not only the vehicles, but the vehicle operators. Further, these trucks are sometimes rented or leased, by the vehicle owner, to a an operator of a work site. While overloading the trucks may increase short-term productivity, as desired by the rental operator, the long-term costs of such operations must be borne by the owner.

To balance the interest in hauling at maximum potential with the interest in maximizing vehicle life, vehicle owners often request vehicle manufacturers to provide an "acceptable" overload amount (or percentage above the target, or acceptable, payload), wherein the adverse effects to the vehicle are minimized while still permitting the hauling of large loads.

Currently, systems exist that determine and store the payload weights of a vehicle. One such system is shown in U.S. Pat. No. 5,182,712 entitled "Dynamic Payload Monitor." This system includes an on-board processor that stores a set of payload weights and may calculate the average payload and overload percentage. These calculations, however, do not provide the operator or owner with sufficient information or incentive to alter his behavior in order to obtain and/or continue compliance with applicable standards.

The present invention is directed to overcoming one or more of the problems or disadvantages associated with the prior art.

SUMMARY OF THE INVENTION

A method is provided for promoting compliance by a vehicle operator with a payload standard for a vehicle. The payload weight of the vehicle is determined. The payload weight is compared with the payload standard to determine if the payload weight is compliant with the payload standard. The operation of the vehicle is then limited if the payload weight is not in compliance.

Further, a method is provided for protecting a vehicle carrying a payload of a payload weight. A target payload and an overload setting are provided. A payload weight is obtained from the vehicle. The payload weight is compared to the target payload plus the overload setting to determine if the payload weight is greater than the target payload plus the overload setting. If not, normal vehicle operation is permitted. If the payload weight is greater than the target payload plus the overload setting, a warning event is provided and limited vehicle operation is permitted.

Further, there is provided a system for protecting a vehicle having a transmission and an engine, the vehicle being subject to a payload standard. The system includes a payload sensing system for obtaining a payload weight and an on-board computer operably connected to both the transmission system and the payload sensing system. The on-board computer also includes information about the payload standard. The on-board computer will cause the transmission system to permit limited vehicle operation when the payload weight obtained from the payload sensing system indicates the vehicle is in non-compliance with the payload standard.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate an exemplary embodiment of the invention and together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
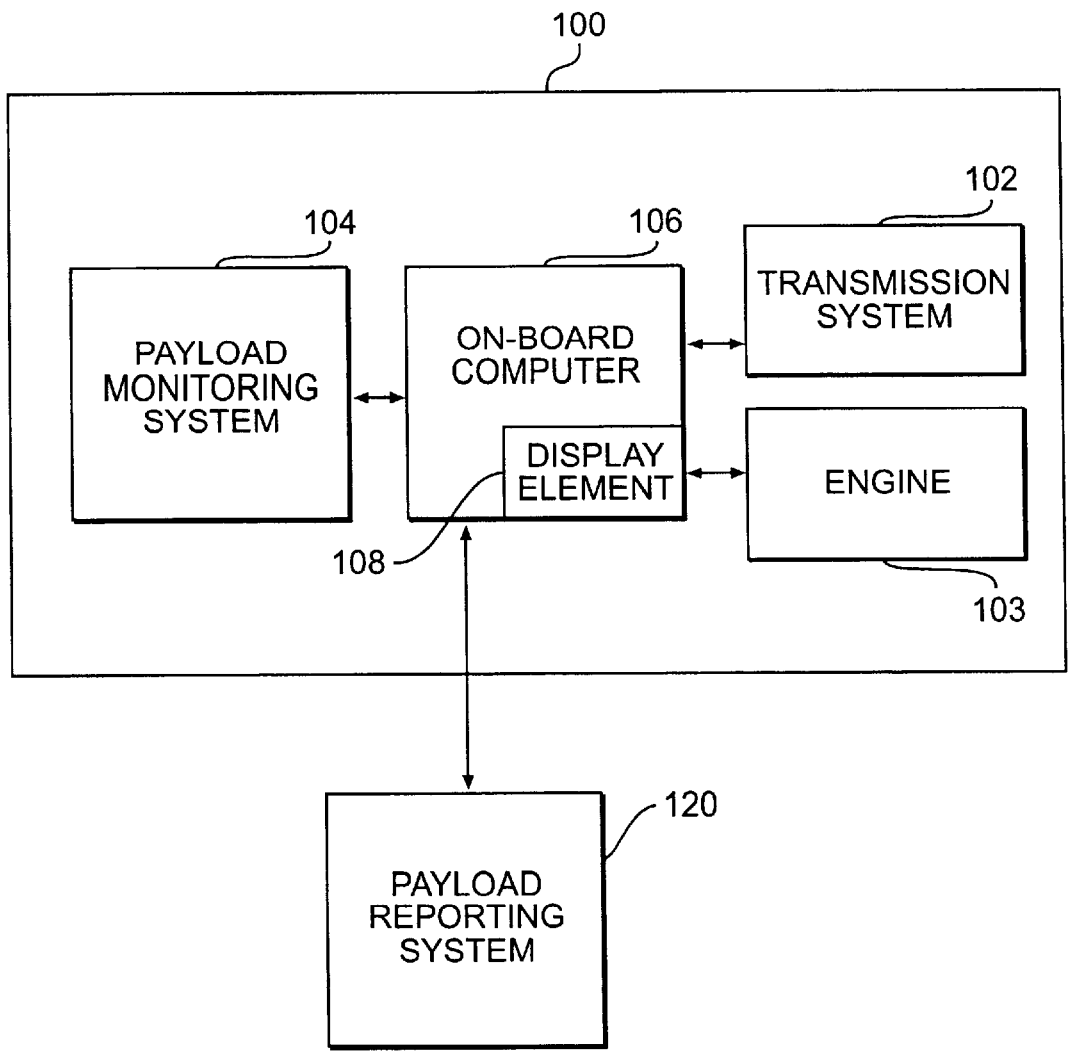
FIG. 1 is a block diagram of a maximum payload speed manager system consistent with an exemplary embodiment of the present invention.

FIG. 1 illustrates an exemplary system consistent with the present invention. The system, as shown in FIG. 1, is based in a vehicle 100. Vehicle 100 may be an off-highway truck, or may be any other vehicle that carries payloads of varying weights. Vehicle 100 includes a transmission system 102, an engine 103, a payload monitoring system 104, and an on-board computer 106. Transmission system 102 includes any propulsion system or any other mechanism that transfers power from engine 103 to drive the vehicle.

Payload weights may be collected by payload monitoring system 104. Payload monitoring system 104, for example, may include pressure transducers in the vehicle's suspension cylinders or shock absorbers. The pressure transducers sense the change in pressure in the cylinders as the vehicle is loaded with cargo. Payload weights collected by payload monitoring system 104 are sent to on-board computer 106. On-board computer 106 may include a display element 108, to provide information to the vehicle operator. Information may alternatively be conveyed to the vehicle operator through other means, such as an audio message. Further, on-board computer 106 may include a memory or other storage for target payload information, acceptable overload standards, and instructions for reacting based on the sensed payload information. On-board computer 106 may also be equipped with wireless communication capabilities, with which vehicle 100 may communicate payload information as well as vehicle reaction to the payload to an external payload reporting system 120. Alternatively, on-board computer 106 may include an on-board port, providing direct access to the on-board computer. In this case, a technician or other person with a service tool, such as a handheld computing device or laptop computer, can directly access on-board computer 106 via the on-board port to program and/or download data from on-board computer 106. Payload reporting system 120 may be located, for example, at a centralized mining operation office or any other location where the knowledge of a vehicle's compliance with payload standards would be useful.

On-board computer 106 may be implemented in various environments to provide the tools for obtaining the required data and providing the data to the operator and the payload reporting system 120. On-board computer 106 may be hardware specifically constructed for performing various processes and operations of the invention or may include a general purpose computer or computing platform selectively activated or reconfigured by program code to provide the necessary functionality.

On-board computer 106 compares the payload weight information received from payload monitoring system 104 with the stored payload target and overload setting information, and determines an appropriate reaction. In some instances, the reaction may be normal vehicle operation. In other instances, when the payload weight sensed is greater than the acceptable overload setting, onboard computer 106 may cause transmission system 102 to limit the operation of vehicle 100. For example, the transmission shift range may be limited to a particular gear. Alternatively, or as a supplement to limiting the transmission operation, the engine speed may be limited. In one exemplary embodiment, the transmission shift range is limited to second gear, engine speed is limited to 1750 rpm in second gear, and automatic retarding is limited to 1750 rpm.

By effecting the vehicle's operation in overloaded conditions, both the operator and the vehicle are protected. The limited operation of the vehicle may also promote compliance with payload standards in the future, as the operator may be frustrated by the vehicle's limited operation when overloaded.

Figure 2:
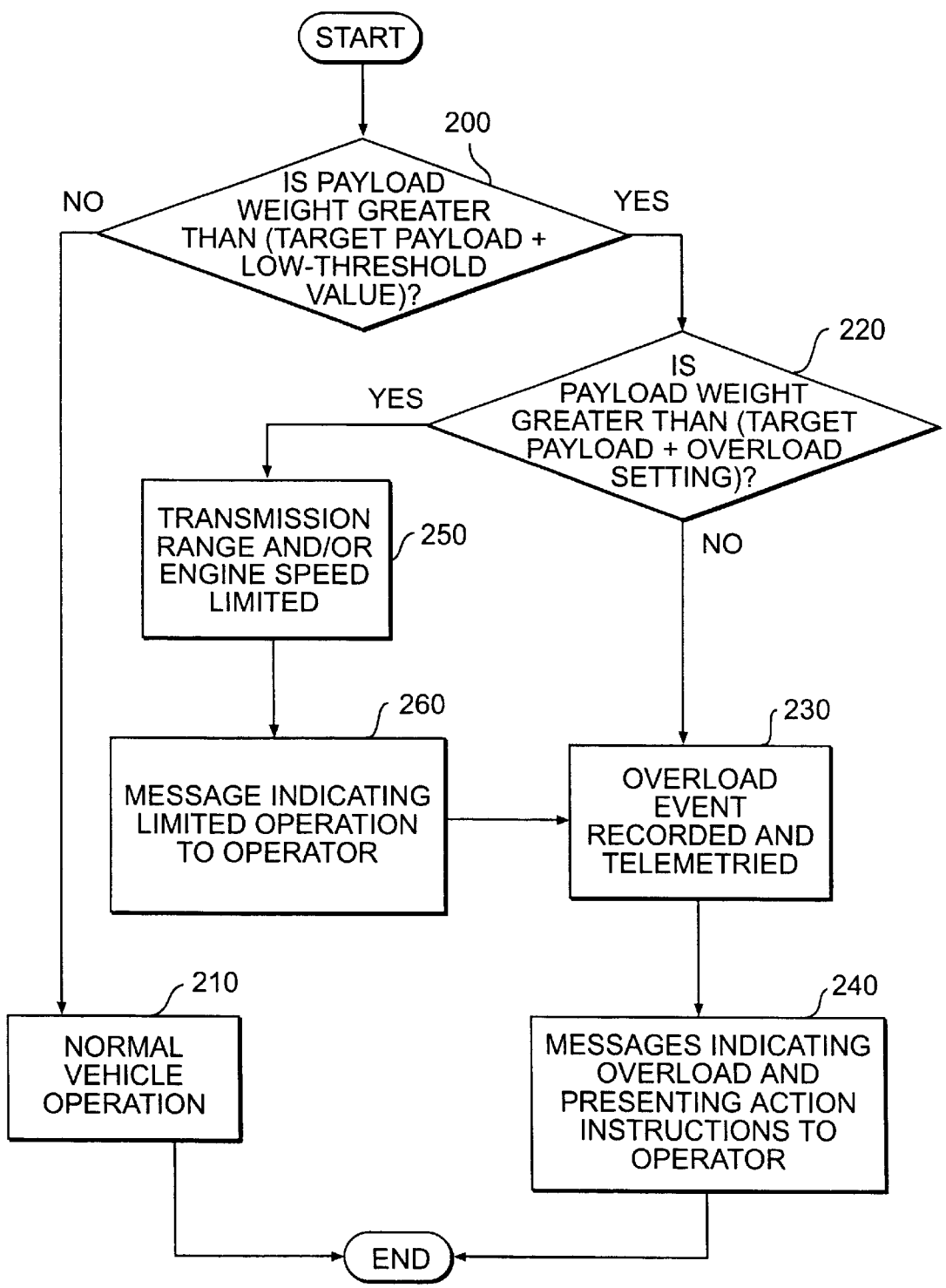
FIG. 2 is a flow chart of an exemplary embodiment of a method, consistent with the present invention, for promoting compliance with a payload standard and protecting vehicles and operators.

FIG. 2 illustrates an exemplary flow chart of an algorithm used by on-board computer 106 for protecting the vehicle and operator during overload conditions and for promoting compliance with payload standards. As described above, on-board computer 106 receives payload weight information from payload monitoring system 104. Further on-board computer 106 may include a memory storing information about the target payload and/or the overload setting for the vehicle. With this information, on-board computer first determines whether the payload weight is greater than the target payload plus a low-threshold value (step 200). The target payload is the specified allowable payload, and preferably depends on the model and configuration of the vehicle. The low threshold value is a numerical expression of the payload standards as described above. For example, for a given vehicle, the target payload may be 240 tons. In the 10/10/20 payload standard wherein no more than 10% of payloads may exceed 1.1 times the truck's maximum target payload and no single payload shall exceed 1.2 times the maximum target payload, the maximum overload setting would be 20% of 240 tons, or 48 tons. The low-threshold value may then be represented by a fraction of the maximum overload setting. For example, the fraction of the maximum overload setting may be set at one-half. Thus, in the above example, on-board computer 106 would determine, at step 200, whether the payload weight was greater than the target payload plus the overload setting divided by two, or 240+(48/2)=264 tons. The system and method described herein can be implemented with overload standards other than 10/10/20. Overload settings and low-threshold settings can be preset weights or may be a percentage of the target payload weight.

If the payload weight is less than the target payload plus the low-threshold value, the vehicle maintains normal vehicle operation (step 210). However, if the payload weight is greater than the target payload plus the low-threshold value, on-board computer 106 next determines if the payload weight is greater than the target payload plus the overload setting (step 220). Continuing the example started above, on-board computer 106 would determine whether the payload weight was greater than 288 tons (or 240+48).

If the payload weight is greater than the target payload plus the low-threshold value, but less than the target payload plus the overload setting, a warning event occurs. The overload event may be recorded by on-board computer 106 and telemetried, or sent via wireless communication, to payload reporting system 120 (step 230). Further, on-board computer provides the operator with a message indicating the vehicle is overloaded and presents the operator with action instructions to correct the problem (step 240). Exemplary action instructions may include a message telling the operator to drive carefully if a warning event occurs. In this warning situation, however, the operation of the vehicle is not limited. In an alternative embodiment, these warning event steps may be omitted. In yet another alternative embodiment, warning events may not be provided to the operator of the vehicle immediately following the sensing of an overloaded vehicle, but rather, may be stored in on-board computer 106 until downloaded, for example, during routine maintenance.

If the payload weight is greater than the target payload plus the overload setting, a reaction event occurs. For example, the transmission range and/or engine speed may be limited (step 250). For example, the vehicle may be limited such that it can not shift above a specified gear and the engine speed for that gear can be limited. On-board computer 106 provides the operator with a message indicating that the vehicle's operation is limited (step 260). Finally, the steps that follow a warning event also occur—namely, the overload event is recorded by on-board computer 106 and telemetried to the payload reporting system 120 (step 230) and the operator receives a message indicating the overload and presenting action instructions (step 240). An exemplary action instruction for this situation may tell the operator to empty the load. In an alternative embodiment, overload events may not be telemetried immediately following the sensing of an overloaded vehicle, but rather, may be stored in onboard computer 106 until downloaded, for example, during routine maintenance.

Figure 3:
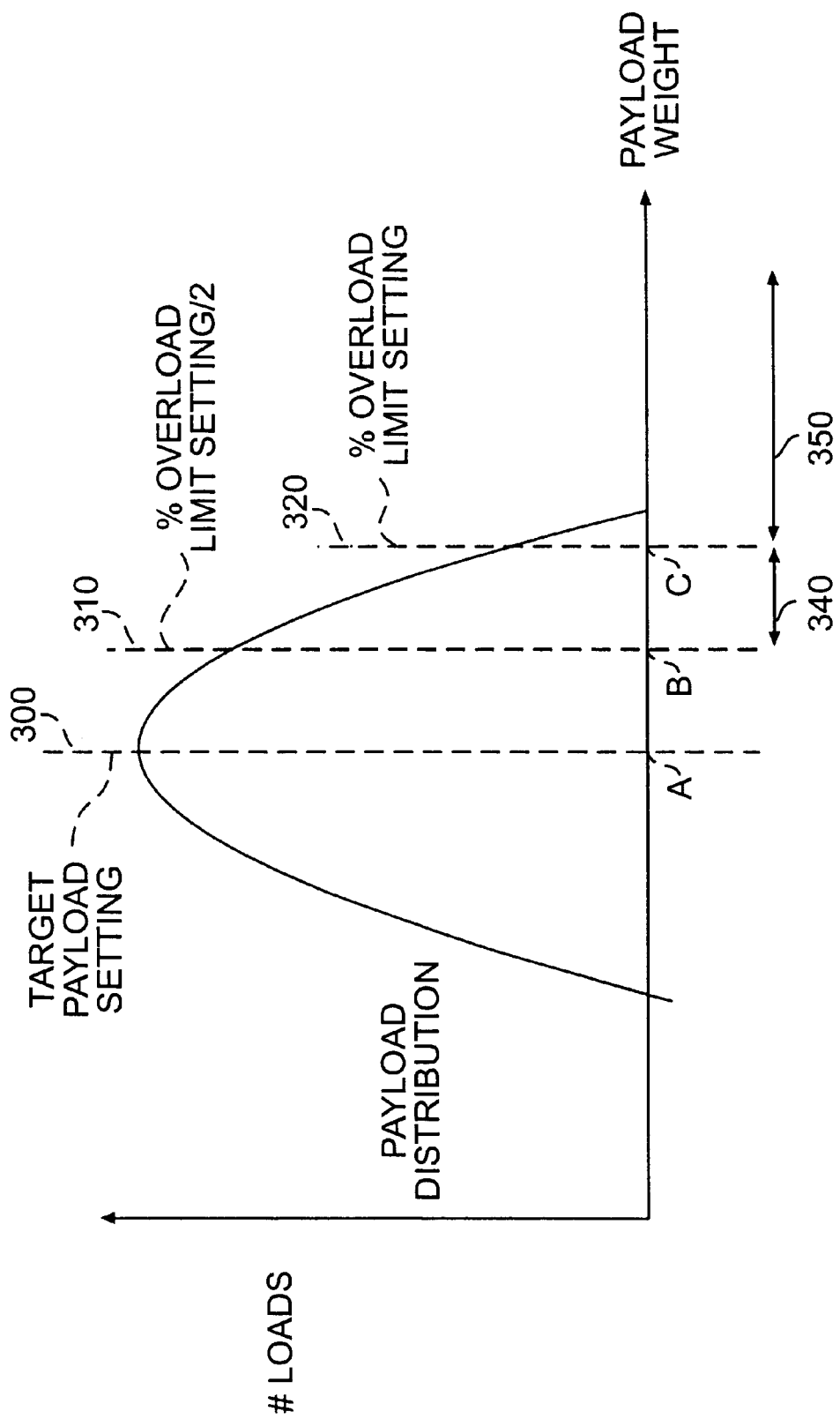
FIG. 3 is an exemplary graph illustrating the various operating ranges for vehicles, consistent with the present invention.

FIG. 3 is an exemplary graph illustrating the operating ranges of a vehicle. Line A 300 represents the target payload. Line B 310 represents the low-threshold value. Line C 320 represents the overload setting. When the payload is between the x-axis and line A or between lines A and B, the vehicle has normal operation. When the payload is between lines B and C (or range 340), there is a warning event. When the payload is to the right of line C (or range 350), there is a reaction event. Ideally, vehicle's payloads should be centered around line A 300, with none exceeding line C 310.

INDUSTRIAL APPLICABILITY

A system and method are provided to promote compliance with payload standards and to protect vehicles and operators. By comparing a payload weight of a vehicle to an overload target weight, the system will react by affecting the operation of the vehicle if the payload weight indicates an overloaded situation. Vehicle operation may be affected by limiting the transmission shift range and/or limiting the engine speed at the specified gears. Through these reactions, the vehicle will not be able to operate at normal speeds, and thus, the negative effects possible in an overloaded condition may be minimized or averted. Furthermore, because the vehicle will not operate at normal speeds when overloaded, the vehicle operator is provided with an incentive to stay within the payload standards for the vehicle.

The system may be "locked"—or the system may have safeguards so that the vehicle operator may not tamper with the system. Furthermore, the system may operate such that, as soon as an overload condition is sensed by payload monitoring system 104 (regardless of whether the vehicle is in a loading state or is traveling the roadway), the vehicle's operation is limited. This prevents an operator from trying to bypass the reaction event by effectively adding additional payload when in a non-traditional loading state. The limited operation may continue until the vehicle is emptied, or until the payload monitoring system 104 determines the presence of a payload in compliance with the applicable standard. In another exemplary embodiment, payload monitoring system 104 may recalculate the payload weight after the truck has left a loading site in order to improve on any inaccuracies that may occur due to loading state positioning. In this alternative, the payload weight sensed after the truck has left the loading site may override a reaction event that occurred at the loading site, and may return vehicle operation to normal if the payload weight is in compliance.

The low-threshold value and the overload setting may be set by the vehicle manufacturer, vehicle dealer, or vehicle owner, provided the person has appropriate tools, such as a special keypad or a telemetry link to on-board computer 106. Further, the parameters controlling the operation of a vehicle during a reaction event may also be set by any appropriate party. Precautions may be taken to prevent a vehicle operator from tampering with these settings, such as use of appropriate tools or providing a password protected means for setting the parameters and weights.

While the exemplary embodiment has been discussed in connection with off-highway trucks in a mining environment, the system and method described herein have potential application in any vehicle subject to payload standards. Further, while the exemplary embodiment has been discussed in connection with a vehicle having a transmission system, shift range, and gears, it should be understood that systems and methods consistent with the present invention are applicable to any propulsion system and its respective mechanisms.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A method for promoting compliance by a vehicle operator with a payload standard for a vehicle, the method comprising:

determining a payload weight of the vehicle;

determining whether the payload weight is in compliance with the payload standard;

limiting operation of the vehicle if the payload weight is not in compliance; and providing the vehicle operator with action instructions to gain compliance with the payload standard when the payload weight of the vehicle is not in compliance with the payload standard.

2. The method of claim 1, wherein the step of limiting operation of the vehicle includes limiting transmission shift range.

3. The method of claim 1, wherein the step of limiting operation of the vehicle includes limiting engine speed.

4. The method of claim 1, further including:

alerting the vehicle operator when the payload weight of the vehicle is not in compliance with the payload standard.

5. The method of claim 1, further including:

determining again whether the payload weight is in compliance with the payload standard at a predetermined time; and releasing any limitations on the operation of the vehicle if the payload weight is in compliance.

6. A method for protecting a vehicle carrying a payload having a payload weight, the method comprising:

providing a target payload;

providing an overload setting;

obtaining a payload weight from the vehicle;

determining whether the payload weight is greater than the target payload plus the overload setting;

permitting normal vehicle operation if the payload weight is not greater than the target payload plus the overload setting;

providing a warning event if the payload weight is greater than the target payload plus the overload setting; and limiting vehicle operation if the payload weight is greater than the target payload plus the overload setting.

7. The method of claim 6, further including:

providing information about payload standards via telemetry equipment.

8. The method of claim 6, further including:

providing a low-threshold value;

determining whether the payload weight is greater than the target payload plus the low-threshold value; and providing a warning event if the payload weight is greater than the target payload plus the low-threshold value.

9. The method of claim 8, wherein the low-threshold value equals the overload setting divided by two.

10. The method of claim 6, wherein the warning event includes the following step:

storing a record of the overload event.

11. The method of claim 6, wherein the warning event includes the following step:

providing an alert indicating an overloaded situation.

12. The method of claim 11, wherein the alert includes at least one of a video display or an audio message.

13. The method of claim 6, wherein the warning event includes the following step:

sending a record of the overload event to a payload monitoring system.

14. The method of claim 6, wherein the step of permitting limited vehicle operation includes limiting the transmission shift range.

15. The method of claim 6, wherein the step of permitting limited vehicle operation includes limiting the engine speed.

16. A system for protecting a vehicle having a propulsion system and an engine, the vehicle being subject to a payload standard, the system comprising:

a payload sensing system for obtaining a payload weight; and an on-board computer, operable connected to both the propulsion system and the payload sensing system and including information about the payload standard, wherein the on-board computer limits vehicle operation when the payload weight obtained from the payload sensing system indicates the vehicle is in non-compliance with the payload standard and provides an operator of the vehicle with action instructions to gain compliance with the payload standard.

17. The system of claim 16, further including a payload monitoring system, wherein the on-board computer sends a message indicating non-compliance to the payload monitoring system.

18. The system of claim 16, wherein the limited vehicle operation permitted by the on-board computer when the vehicle is in noncompliance includes a limited transmission shift range.

19. The system of claim 16 wherein the limited vehicle operation permitted by the on-board computer when the vehicle is in noncompliance includes a limited engine speed.

20. The system of claim 16, wherein the on-board computer further includes a visual display element for providing an alert to a vehicle operator when the vehicle is in non-compliance.

21. The system of claim 16, wherein the information about payload standards is provided to the on-board computer via telemetry equipment.

22. The system of claim 16, wherein the on-board computer is equipped with safeguards to prevent an operator from overriding the onboard computer that limits vehicle operation.

23. The system of claim 22, wherein the safeguards include a password protected system.

* * * * *